Sept. 7, 1943.   J. B. WASSALL ET AL   2,329,168
AIRCRAFT LANDING GEAR
Filed May 21, 1940   3 Sheets-Sheet 1
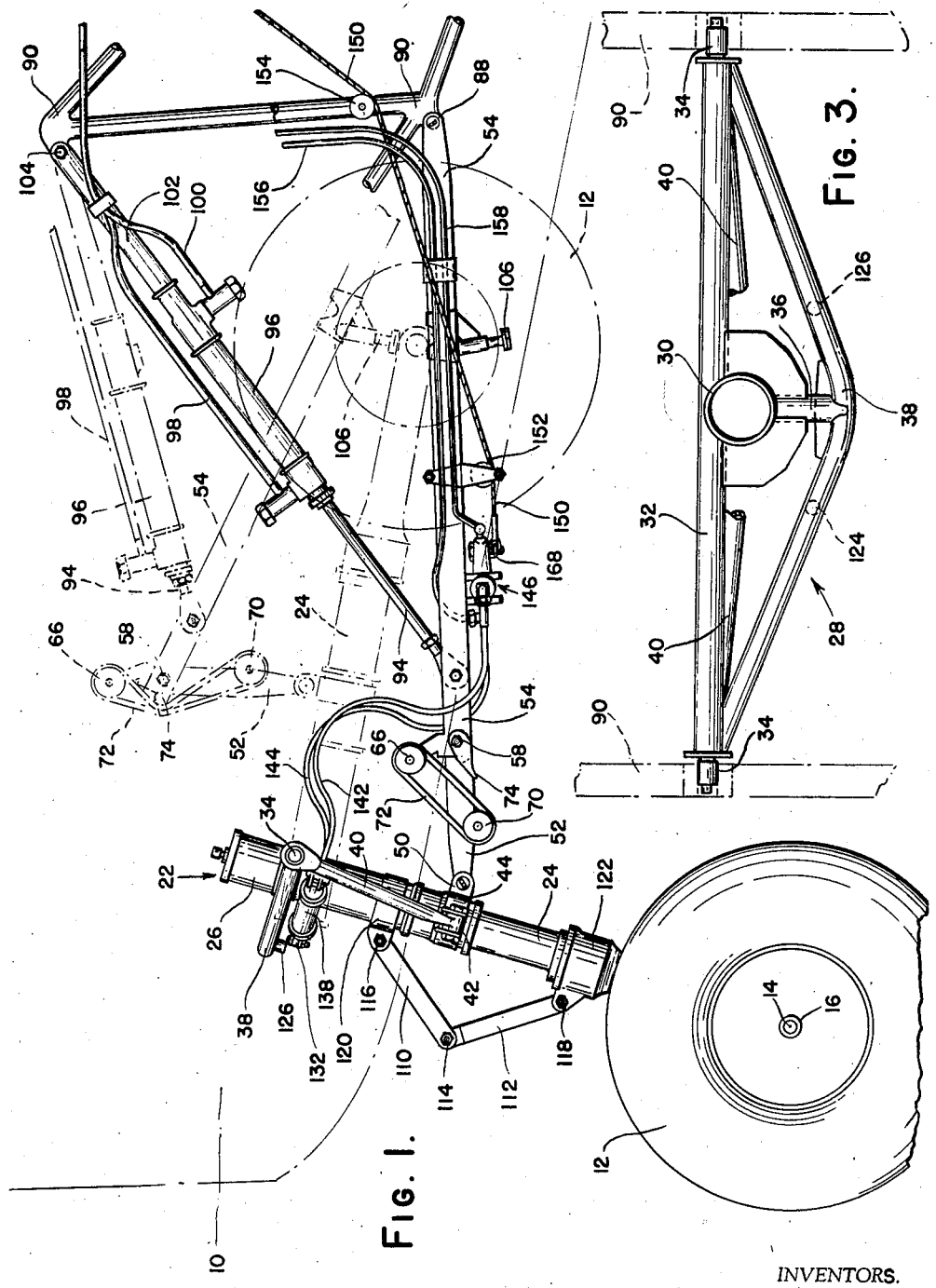
INVENTORS.
JOHN B. WASSALL AND
WILFRED N. WALLACE.
BY
ATTORNEY.

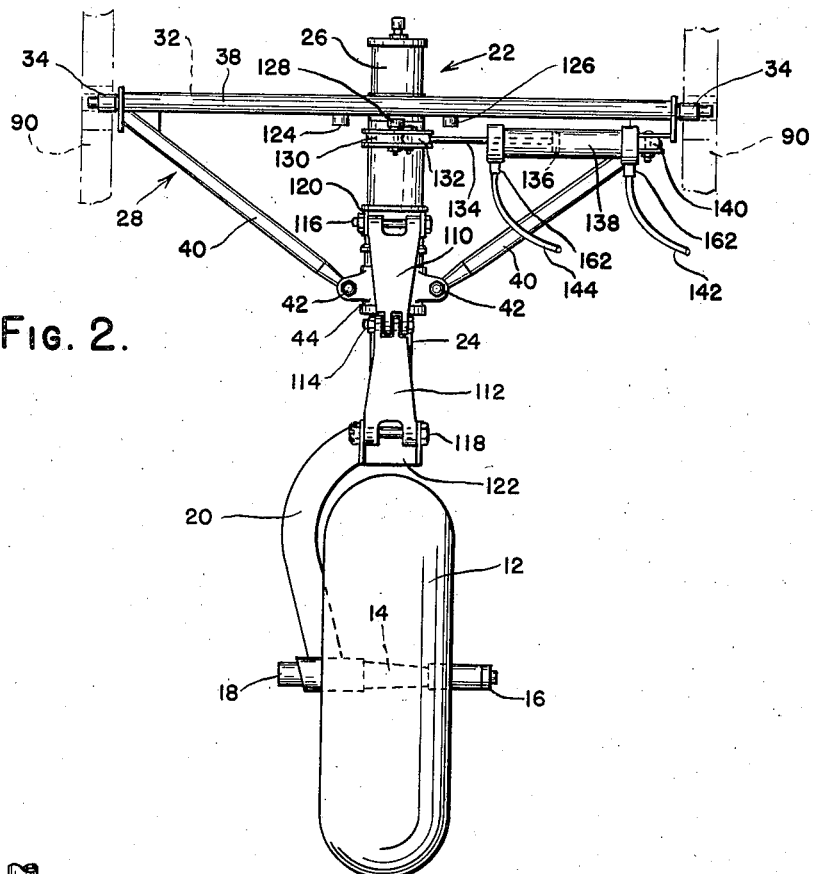
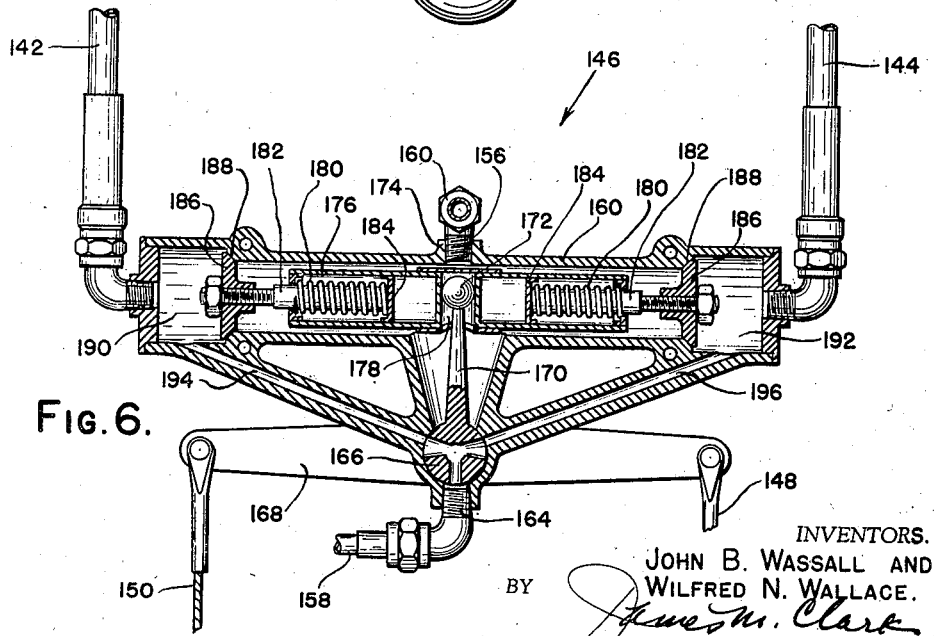

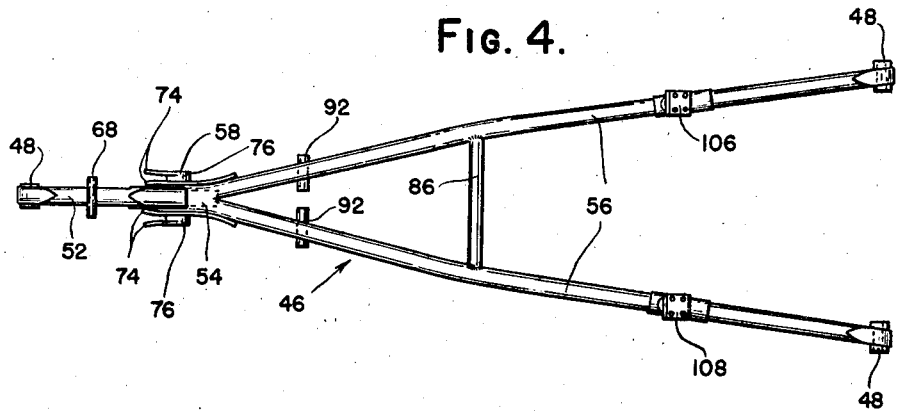
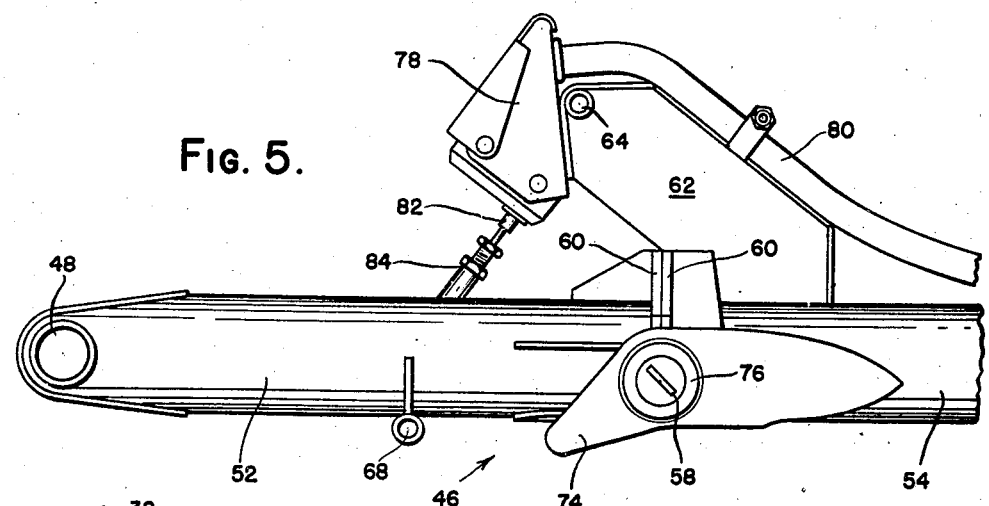
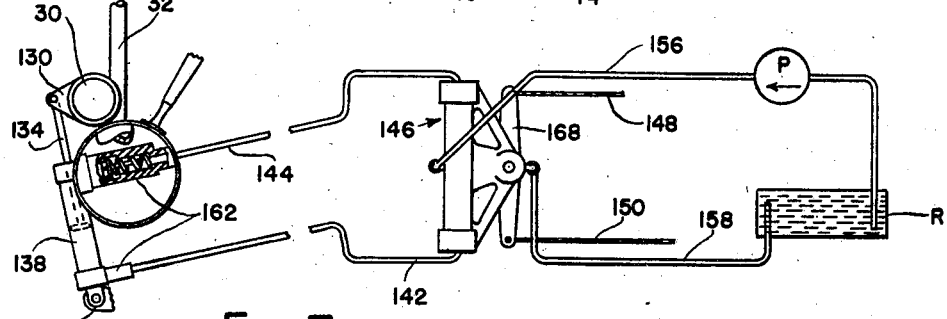

Patented Sept. 7, 1943

2,329,168

UNITED STATES PATENT OFFICE 2,329,168

AIRCRAFT LANDING GEAR

John B. Wassall, Burbank, and Wilfred N. Wallace, Glendale, Calif., assignors, by mesne assignments, to Vega Aircraft Corporation, a corporation of California Application May 21, 1940, Serial No. 336,414

6 Claims. (Cl. 244—50)

This invention relates to retractable and steerable landing gears for aircraft and more particularly to mechanism by which the retracting and steering movements may be effected.

In aircraft it has heretofore been common practice to accomplish steering of the vehicle on the ground by the use of a steerable tail skid or tail wheel. At the present time, however, there is a growing trend to revive the well known tricycle arrangement of the landing wheels wherein a single wheel is disposed well forwardly under the craft and a pair of laterally spaced wheels are disposed aft of the center of gravity. Such an arrangement also has the advantage of keeping the aircraft in the same horizontal attitude on the ground as is maintained in flight. This general practice was widely adopted in the early days of flying but then was entirely neglected through all of the subsequent period of rapid development of the airplane. Due to its inherent directional stability, desirable at high landing speeds and under conditions of uneven wheel braking, it is particularly desirable of use in modern aircraft of all sizes. However, very few satisfactory arrangements of retractable tricycle landing gears, particularly retractable nose wheels, have been either proposed or built as a result of difficulties encountered in arresting shimmying, providing suitable steering mechanism, stowage space, points of attachment and other conditions.

Accordingly, it is an important object of this invention to provide a retractable landing gear unit suitable for use as a nose wheel in a tricycle landing gear; such a unit being adapted for incorporation in modern aircraft of the present advanced state of development.

A coordinate object of this invention is to provide mechanism associated with such a landing gear by which it may be rendered steerable so that aircraft movements can be controlled when the craft is moved about on the ground.

Another object is to provide in a steerable landing gear unit, means to arrest torsional vibrations, generally known as landing gear shimmy, which may be set up in the landing gear as the result of passage over rough or uneven ground surfaces and other causes.

Still another object is to provide a steering mechanism accomplishing the dual functions of automatically damping torsional vibrations occurring in the landing gear system and of imparting steering movements to the ground engaging element of the system.

A further object is to provide a retractable landing gear which is adapted to support the weight of the aircraft in emergencies even though the gear may be in its retracted attitude.

And a still further object is to provide resilient means incorporated in a retractable landing gear for the purpose of bringing the retracting movement to a resilient termination and of providing an initial impulse to aid in starting the extending movement.

A complete understanding of the invention may be had by referring to the annexed drawings in connection with the following specification.

In the drawings:

Fig. 1 is a side phantom view of part of an aircraft showing a landing gear and the operating elements associated therewith;

Fig. 2 is a front elevation of the same landing gear;

Fig. 3 is a plan view of the bracing framework for the landing gear;

Fig. 4 is a bottom plan view of the drag or breaking strut elements;

Fig. 5 is an enlarged side view of the joint portion of the strut shown in Fig. 4;

Fig. 6 is a cross-sectional view of a valve forming part of the hydraulic steering system operating on the landing gear; and Fig. 7 is a diagrammatic showing of the hydraulic steering system.

Referring first to Figure 1, there is shown in phantom outline a portion 10 of an aircraft and in this portion is arranged the component parts which make up this invention. As is usual the landing gear terminates in some form of ground engager which in the present instance is shown to be a rubber tired pneumatic wheel 12. This wheel is carried by a stub axle 14 which has extensions 16 and 18 projecting on either side of the wheel. The purpose of these extensions will appear later.

The wheel axle 14 is rigidly carried by a curved bracket 20, which at its upper end rigidly connects to a telescopic shock strut generally designated 22 and consisting of a lower piston element 24 telescopically received in an upper cylinder element 26. The assembly so far described is more or less conventional in aircraft use and embodies an oleo unit within the telescopic halves 24 and 26. This assembly being well known in the art, it is not considered necessary to describe it in further detail.

However, the mounting of the shock strut 22 is a part of this invention and comprises a framework 28 (see especially Figs. 3 and 2) which rigidly supports the wheel-carrying strut but yet allows for turning movements of the strut 22 about its own axis. The framework consists of a centrally located collar 30 into which the upper part 26 of the shock strut 22 fits. This collar is braced and welded to a straight tubular member 32 which terminates at each end in trunnion stubs 34, which are journalled within suitable supports provided upon the engine or the aircraft structure, and which mount the framework 28 so that it can be rotated with respect to the aircraft body portion 10.

Extending from the collar 30 at right angles to the member 32 and in the same plane therewith is a short tubular member 36 which intersects with a bow shaped tubular member 38 at the latter's midpoint (see Fig. 3). This member 38 curves rearwardly from its middle to rigid connections with the ends of member 32. Also, as shown in Figs. 1 and 2, a pair of rigid braces 40 each slant downwardly from these same ends of member 32 to a bolted connection at 42 between ears of the collar 44 which surrounds the lower end of oleo cylinder 26. There is a sliding fit between the collar 44 and the strut is journalled in this collar in the same manner as in collar 30 in the frame 28. Such provision for turning movements of the strut adapts it to be steered under the control of mechanism to be described later. Also to be described hereinafter is mechanism to cause retractive swinging of the landing gear including the framework 28 about the trunnion stubs 34.

In the extended position of the landing gear, it is braced in the fore and aft direction by means of a breaking Y-shaped strut 46 shown in more detail in Figs. 4 and 5. This strut is fitted at each of its three extremities with bearing eyes 48. At the front end the eye 48 is inserted between apertured ears 50 extending from the collar 44. A bolt extending through the ears and the eye holds the two together and effects a pivotal connection between the strut 46 and the shock strut 22. The strut 46 consists of a short fore portion 52 and a considerably longer rear portion 54 which forks into a pair of symmetrical arms 56. The portions 52 and 54 are joined together by means of a pivot joint 58 which preferably is offset slightly below the center line of the strut 46 as shown in Fig. 5. Abutments 60 are provided on both sides of the joint line which contact each other when the members 52 and 54 lie in the same plane. This allows the joint to be "broken" in only one direction and makes the brace rigid in all other respects.

Another feature of the present joint is the rigid member 62 which projects upwardly from strut portion 54 and then inclines forwardly over the joint line for an appreciable distance. This member is fitted with a bushing 64 adapted to receive a spindle carrying a pair of grooved discs or sheaves 66. An identical bushing 68 is provided on the strut portion 52 which receives a spindle carrying a second pair of identical sheaves 70 spaced on either side of the bushing. Strong rubber loops or shock cords 72 are stretched over each pair of discs 66—70 to thus bridge the joint of the breaking strut 46. At this joint 58, on either side thereof are identical pairs of spaced plates 74 which extend from cylindrical bushings 76 on either side of the joint. When the joint is broken to retract the landing gear to the position shown by dotted lines in Fig. 1, the rubber rings or loops 72 are stretched, since the spacing between the discs 66 and 70, which normally is only enough to slightly tension the rings, becomes greater. At the same time each pair of spaced plates 74 moves with the strut portion 54 to straddle one of the rubber rings 72 which latter is thereafter contacted by the bushings 76 and further stretched thereby to a maximum tension at the fully retracted position of the landing gear. This organization provides a resilient termination to the retracting movement. On the other hand it also provides an initial force to aid in starting the unfolding of the mechanism of the landing gear for movement to the fully extended or aligned position. The sheaves and loops have been omitted from the strut details in Figs. 4 and 5 for the sake of clarity.

Another purpose served by the structural member 62 is the support of a micro-switch housing 78 (see Fig. 5) connected by an electrical cable 80 to a circuit including signal apparatus to indicate the retractive attitude of the landing gear. This switch is operated by a projecting pin 82 which contacts an adjustable pin abutment 84 when the landing gear is fully extended.

Returning again to the features of the "breaking" strut 46 and especially the portion 54, it will be seen in Fig. 4 that the fork arms 56 are cross-braced by a transverse member 86 and that the rear ends thereof are terminated by bearing eyes 48 which, as shown at 88 in Fig. 1, serve for the attachment of the strut to structural members 90 of the framework of body 10. The arms 56 are also fitted with aligned and spaced bushings 92 adapted to receive a spindle which passes through an aperture in the end of a piston rod 94. The end of the rod is connected between the bushings 92 with the connection being such that the rod can pivot on the spindle. A hydraulic cylinder 96 is provided into which the rod 94 extends where it terminates in a suitable piston head located in a cylindrical chamber provided at either end with flexible fluid conduits 98 and 100. These conduits extend along an extension 102 of the cylinder 96 to connection with a reversing valve (not shown) but of any suitable type well known to the art by which either end of the cylinder 96 may be connected to a source of fluid pressure for the purpose of moving the rod 94 telescopically with respect to the cylinder. Because the extension 102 is pivotally mounted at 104 on the structural members 90, the drawing of the strut 94 into the cylinder will first break the joint 58 and if the action is then continued there will follow a concurrent pivoting of the cylinder 96 about the point 104; of the strut portion 54 about the points 88; and of the framework 28 on the trunnion stubs 34 from the full line or extended position to the dotted line or retracted position. As before explained the framework 28, when it pivots, carries with it the landing gear strut 22 and the ground engager 12 to the retracted position where all of the gear except for a part of the wheel 12 are completely housed within the outlines of the body 10.

The portion of the wheel 12 which projects from the body is deliberately caused to do so for the reason that in the event the landing gear cannot be extended or for any other reason an emergency landing is made with the gear in such an attitude, then this exposed portion will contact the ground and prevent the body of the aircraft from doing so. In order that wheel 12 can carry an emergency load when it is in such an unnatural position the fork arms are provided wtih adjustable abutments 106 and 108. Then when the load occurs on the wheel the axle extensions 16 and 18 are forced to contact the faces of these abutments (if the contact has not previously occurred) whereupon the loading on the wheel will be distributed through the fork arms 56 and thus into the framework 90. It may be noted at this time that due to the forked construction of the strut portion 54, the wheel 12 passes between the fork arms 56 and it is therefore possible for the axle to make contact with or bridge the abutments 106 and 108.

The remaining feature of this invention, yet to be described, is perhaps the most important part thereof, accomplishing as it does the dual functions of automatically attenuating any torsional vibration or shimmy which may be set up in the landing wheel-shock strut combination and of providing a means by which the wheel may be steered during ground travel.

Before entering the description of this mechanism it should be noted that the two telescoping parts 24 and 26 of the shock strut would otherwise be free to rotate with respect to each other but in accordance with present practice a nut-cracker linkage consisting of arms 110 and 112, pivotally joined at 114, and respectively pivotally connected at 116 and 118 to collars 120 and 122 on the shock strut portions 24 and 26 is provided for the purpose of preventing such relative turning. This linkage also serves to transmit steering movements applied to the top of the strut 22 to the wheel 12; the collars 120 and 122 being fixed to their respective strut portions.

Such steering movements are limited to a prescribed angle by spaced stops 124, 126 on the tubular member 38 (see Fig. 2). Operating in the space between these stops is a contact element 128 fixed to a projection of a collar 130, which is in a fixed surrounding engagement with the strut portion 26 and therefore partakes of any of its movements.

Steering movements are applied to the shock strut through a connection to the same projection of the collar 130. This connection is organized for pivotal movement at the point 132 and comprises a piston rod 134 terminating in a piston 136. Enclosing the piston is a cylindrical fluid tight casing 138 which is pivotally attached at 140 to one end of the framework 28. This pivotal mounting of the cylinder allows it to align itself at all times with the piston rod 134 following steering movements of the shock strut. The piston-cylinder combination 132—138 constitutes an hydraulic slave unit controlled from a remote point in the aircraft and is the immediate means by which steering movements are imparted to the strut 22 since fluid pressure admitted to one side or the other of the piston will cause movement thereof.

Pressure lines 142 and 144 lead from the ends of cylinder 138 to a distributing control valve 146. This valve is preferably mounted on the breaking strut portion 54 by straddling the fork arms 56 and being bolted thereto as shown in Fig. 1. Control of the valve is accomplished from a remote point by means of cables 148 and 150 which pass over sheaves 152 and 154 to a suitable pedal, or other operating lever, not shown but of a type commonly employed for such control purposes. The valve 146 is also connected to a source of pressure P by a direct flexible fluid conduit 156 and a return line 158 leading to a liquid reservoir R (see Fig. 7).

Referring now to Fig. 6 for details of the control valve 146, it is seen to comprise a fluid-tight casing 160 of a generally cylindrical shape. The fluid conduits 142 and 144 extend from either end of the valve casing to their connection with the slave or servo unit cylinder 138. Each of these conduits includes a check valve indicated at 162 in Fig. 2 and shown in some detail in Fig. 7. These check valves are of well known construction being of the type which are normally held open to permit of normal or steady passage of fluid. Springs are employed to keep the valves open but they are so organized that any sudden rush of fluid flowing outwardly from the slave unit 138 toward the valve 146 has the effect of instantaneously closing the valve. This characteristic is taken advantage of to attenuate shimmy effects introduced to the landing wheel and its shock strut by passage over the ground. When such vibration occurs in the system the piston is rapidly oscillated and this sets up pulsations in the contained liquid with the result that the check valves immediately close and the relatively incompressible liquid employed in the cylinder 138 is trapped on both sides of the piston 136. When so trapped it acts to absorb the vibration effects and prevents them from being transmitted into the aircraft structure.

The system for producing steering movements will now be considered, starting with a detailed description of the inner mechanism of the distributing valve 146. As before stated, the casing 160 is of a generally cylindrical form and is hollow but it also is formed with an offset portion of triangular shape. This portion at the apex of the triangle receives the end of the exhaust conduit 158 as shown at 164. At this point within the casing is formed a rotatable three-way valve 166 operated by a double armed lever 168. At the ends of the lever are pivotally connected the steering cables 148 and 150 and consequently when the rudder pedals, to which these cables are preferably connected, are moved in one direction or the other, it follows that the lever 168 is moved in exactly the same manner. The valve 166 will concurrently be rotated in one direction or the other away from the neutral position shown. Extending from the valve is an arm 170 fitted at its end with a ball or sphere 172 located exactly in the center of the length of the cylindrical portion of the casing 160. Adjacent this sphere in the side of the casing at 174 is the connection of the conduit 156.

Also within the cylindrical part of the casing and centered therein is a cylindrical spring housing 176 which at its midpoint has a well 178 into which the ball end 172 of the lever 170 fits. Accordingly, when the ball 172 moves to one side or the other in response to operation of the cables 148 and 150, it presses on the spring housing 176 and causes it to be displaced along the line of its longitudinal axis. The central well divides the spring housing into two cylindrical chambers each containing a helical spring 180 surrounding a valve stem or rod 182 which extends outwardly through an aperture in the end wall of the housing 176.

The end of each rod 182 inside the housing carries a member 184, attached thereto and slidable within the cylinder. The spring 180 is confined between the head 184 and the end wall of housing 176 and is normally compressed. Under this arrangement the springs tend to draw their associated rods 182 into the housing but since the rods carry circular valve discs 186 on their opposite ends which seat against valve seats 188 formed in the inner wall of the casing 160, the rods can only be drawn in until the valve discs become seated. With these discs 186 seated, the fluid pressure entering the casing 160 through the conduit 156 is confined to the space between the discs 186.

At each end of casing 160 are chambers 190 and 192 set off from the remainder of the cylindrical portion of the casing by the valve discs 186. These chambers are respectively in communication with the opposite ends of the slave unit 138 by means of the conduits 142 and 144. They are also in communication with the ports in the valve 166 through passages 194 and 196 formed through the triangular portion of the valve casing 160. With the valve 166 in central or neutral position, both of the passages 194 and 196 are in communication with the exhaust conduit 158 which leads to a suitable fluid reservoir. But if the valve 166 is turned in either direction, one or the other of said passages is cut off from such communication due to the shape of the ports in the valve.

The operation of valve 146 is as follows: Pushing the right rudder pedal pulls cable 150 and this pull, transmitted through lever 168 to lever 170, causes spring housing 176 to be moved to the left, reducing the pressure on the left hand spring 180, thereby allowing the left hand valve disc 186 to open under the influence of the hydraulic pressure exerted within the inner chamber open to the fluid source through inlet 156. At the same time the passage 194 is cut off from communication with the return conduit 158 by counter-clockwise movement of valve 166. The liquid in conduit 156, delivered from a hydraulic pump or other pressure source, then flows to the left end of the slave unit or steering cylinder 138 through conduit 142. This causes the piston 136 to move to the right, and turn the strut 22 in the same direction whereby the wheel 12 would cause the aircraft to turn in the same direction. The movement of piston 136 forces the contained liquid out of the right end of cylinder 138, through conduit 144, chamber 192, passageway 196, valve 166, and conduit 158 to the reservoir. Ground reaction on the wheel 12 will make the restoring moment proportional to the displacement. Therefore a constant pressure will hold a constant displacement. Similarly, pushing the left rudder pedal, instead of the right, will produce a directly opposite steering effect and this will be so even though one or the other of the valves 162 may be closed for the hydraulic pressure will be sufficient to open the valve with the assistance of the valve spring.

While this invention has been described and illustrated as being embodied in a nose wheel suitable for use in a tricycle landing gear, it will be perfectly obvious to those skilled in the art, after understanding the invention, that the same characteristics, or as many as are desirable, could be applied to the other wheels of a tricycle landing gear or for that matter to any landing gear. It is also obvious that various other changes or modifications may be made therein without departing from the spirit or scope thereof. It is aimed in the appended claims to cover all such modifications and changes.

What is claimed is:

1. In a steering system for aircraft, a landing gear, a slave unit adapted to produce steering movements, an operating link connecting said slave unit to said landing gear, a control device for operating said slave unit comprising a housing, a connection for the introduction of pressure fluid to said housing, distribution outlets for said housing, conduits joining said distribution outlets to said slave unit, blocking means in said conduits sensitive to rapid changes in fluid pressure, an exhaust outlet for said housing and controllable means operating within said housing to selectively connect said pressure fluid connection to one of said distribution outlets and to simultaneously connect the remaining distribution outlets to said exhaust outlet, the said controllable means being further organized to automatically bypass excess pressure to the distribution outlets connected at the time to said exhaust outlet.

2. In a ground steering system for aircraft organized to normally provide hydraulic damping of landing gear shimmy at all times except when performing the steering function, a steerable landing gear, a reversible hydraulic motor connected to impart steering movements to said gear, a distributing valve for controlling the operation of said motor, a source of pressure fluid, paired conduits operably interconnecting the motor, the valve and the said source, blocking means interposed in the conduits between the motor and the valve to respond to sudden pressure changes for the purpose of opposing the resistance of the pressure fluid to such changes and means for controlling the operation of said valve, the system being so organized as to provide normally open fluid paths between said blocking means and a return conduit of the said paired conduits leading to the pressure source.

3. In a steering system for a retractable landing gear, the combination of a castering ground engager, retracting means connected to said engager, a source of fluid pressure, a distributing valve carried by said retracting means and connected to said source by supply and return conduits, pilot control connections leading to said valve, the said control connections being carried in part by said retracting means for movement therewith, the relative organization of said control connections providing an effective operating connection to the valve only in the extended position of said landing gear, a hydraulic motor connected to impart steering movements to said ground engager and fluid conduits operably interconnecting the said valve and motor, the said system being further organized to provide normally open paths through said valve from the said fluid conduits to the said return conduit whereby the system is adapted to allow centering of the castering ground engager by externally applied force.

4. In a ground steering system for aircraft, a retractable landing gear comprising a steerable main strut, an organization of retracting members operatively associated therewith for relative swinging with respect thereto, a supporting frame for said steerable main strut adapted to pivotally mount the strut for retracting movements, a hydraulic motor carried by said frame, an operating connection between said motor and strut, a motor control valve attached to certain of said retracting members for movement therewith, a remote source of pressure fluid, fluid conduits operatively joining said valve to the motor and to said source, flexible control cables connected to said valve from a remote control point and supporting pulleys mounted with respect to said organization of retracting members to provide taut cable conditions only in the extended position of said retractable landing gear.

5. In a steering system for an aircraft landing gear, the combination of a pilot-controlled distributing valve, a source of fluid pressure connected to said distributing valve, a pressure cylinder mounted adjacent to said landing gear, conduits linking said valve to said cylinder, piston means operating in said cylinder to impart steering movements to the landing gear depending upon control movements of said valve from a neutral position, resilient means acting to restore said valve to neutral position, the said distributing valve having fluid passageways open in the neutral position of the valve to provide a fluid connection between said conduits, and other valve means connected in series with said conduits and operative to prevent the fluid transmission of high frequency oscillatory movements of said landing gear through the fluid system from said pressure cylinder to the said distributing valve.

6. In a steering system for a landing gear, the combination of a pilot-operated control valve, a source of fluid pressure connected through high and low pressure lines to said control valve, a fluid operated motor connected to impart steering movements to said landing gear depending upon control movements of said valve from a neutral position, fluid conduits interconnecting the control valve and the motor, the said control valve having internal passageways open in the neutral position of the valve to place said fluid conduits in intercommunication with each other and with the low pressure line to said source of fluid pressure, resilient means acting to restore said valve to neutral position, and blocking means in said conduits sensitive to rapid changes in fluid pressure and operative to prevent transmission of such pressure changes through said conduits.

JOHN B. WASSALL.
WILFRED N. WALLACE.